(12) United States Patent
Grosso et al.

(10) Patent No.: US 8,065,197 B2
(45) Date of Patent: Nov. 22, 2011

(54) SYSTEM, METHOD, AND COMPUTER PROGRAM PRODUCT FOR EVALUATING PHOTOGRAPHIC PERFORMANCE

(75) Inventors: John Grosso, Charlotte, NC (US); John Davis, Matthews, NC (US); Johnny Grosso, Charlotte, NC (US)

(73) Assignee: Portrait Innovations, Inc., Charlotte, NC (US)

( * ) Notice: Subject to any disclaimer, the term of this patent is extended or adjusted under 35 U.S.C. 154(b) by 1295 days.

(21) Appl. No.: 11/682,471

(22) Filed: Mar. 6, 2007

(65) Prior Publication Data

US 2008/0218600 A1 Sep. 11, 2008

(51) Int. Cl.
*G06Q 30/00* (2006.01)
*G06K 9/62* (2006.01)

(52) U.S. Cl. .................... 705/26.61; 382/155
(58) Field of Classification Search ............ 705/26, 705/27; 382/155
See application file for complete search history.

(56) References Cited

U.S. PATENT DOCUMENTS

| | | | |
|---|---|---|---|
| 5,494,136 A | 2/1996 | Humble | |
| 5,712,830 A | 1/1998 | Ross et al. | |
| 6,038,544 A | 3/2000 | Machin et al. | |
| 6,424,370 B1 | 7/2002 | Courtney | |
| 6,668,203 B1 | 12/2003 | Cook et al. | |
| 6,720,990 B1 | 4/2004 | Walker et al. | |
| 6,775,377 B2 | 8/2004 | McIllwaine et al. | |
| 6,929,177 B2 | 8/2005 | Matsko | |
| 6,938,048 B1 | 8/2005 | Jilk et al. | |
| 6,970,183 B1 | 11/2005 | Monroe | |
| 6,977,679 B2 * | 12/2005 | Tretter et al. .............. 348/231.2 | |
| 7,080,117 B2 | 7/2006 | de Pinto et al. | |
| 2004/0128185 A1* | 7/2004 | Tsai ............................. 705/10 |
| 2004/0257380 A1* | 12/2004 | Herbert et al. ................ 345/619 |
| 2005/0063613 A1 | 3/2005 | Casey et al. |
| 2005/0135458 A1 | 6/2005 | Graves et al. |
| 2005/0189412 A1 | 9/2005 | Hudnut et al. |
| 2006/0004582 A1 | 1/2006 | Claudatos et al. |
| 2006/0147087 A1 | 7/2006 | Goncalves et al. |
| 2007/0016488 A1 | 1/2007 | Ulenas |
| 2008/0069397 A1* | 3/2008 | Bartsch ......................... 382/100 |
| 2008/0144961 A1* | 6/2008 | Litzenberger et al. ........ 382/270 |

FOREIGN PATENT DOCUMENTS

| | | |
|---|---|---|
| JP | 2007 034804 A | 2/2007 |
| WO | WO 97/48076 A | 12/1997 |
| WO | WO 99/46719 A | 9/1999 |
| WO | WO 2005/124620 A1 | 12/2005 |

OTHER PUBLICATIONS

"Ritz Camera Selects Creative Channel Services to Provide Product Knowledge Training for Sales Associates Nationwide" (PR Newswire. New York: Feb. 6, 2007).*

* cited by examiner

*Primary Examiner* — Jeffrey A Smith
*Assistant Examiner* — Courtney Stopp
(74) *Attorney, Agent, or Firm* — Alston & Bird LLP

(57) ABSTRACT

A method for automatically evaluating photographic performance is provided. The method includes recording with a camera device one or more images during a photography session. The images are digitally stored, and image information related to the images is automatically compiled. The image information may include sales data, image content data, image capture data, and sales condition data. Other image information may be manually compiled. At least one photographic performance metric is automatically generated using at least one of the images and the image information. The performance metric acts to facilitate evaluation of one or more aspects of photographic performance. A system and a computer program product for automatically evaluating photographic performance are also provided.

30 Claims, 12 Drawing Sheets

| Store name | Store # | Employee | Photo Sessions | % of Total | Photo Sessions Sales | Photo Sales Avg | Test/Free |
|---|---|---|---|---|---|---|---|
| 00002 - Promenade, Charlotte, NC | 00002 | Smith, Tom | 13 | 7.69 % | $1,641.75 | $126.29 | 5 |
| 00002 - Promenade, Charlotte, NC | 00002 | Jones, Bill | 4 | 2.37 % | $543.85 | $135.96 | 4 |
| 00002 - Promenade, Charlotte, NC | 00002 | Brown, Harry | 7 | 4.14 % | $601.55 | $85.94 | 1 |
| 00002 - Promenade, Charlotte, NC | 00002 | Gates, Mark | 21 | 12.43 % | $2,501.20 | $119.10 | 0 |
| 00002 - Promenade, Charlotte, NC | 00002 | Spencer, Tonya | 0 | 0.00 % | $0.00 | $0.00 | 2 |
| 00002 - Promenade, Charlotte, NC | 00002 | Marshall, Laura | 9 | 5.33 % | $1,087.95 | $120.88 | 0 |
| 00002 - Promenade, Charlotte, NC | 00002 | McCain, George | 19 | 11.24 % | $1,877.05 | $98.79 | 0 |
| 00002 - Promenade, Charlotte, NC | 00002 | Comney, Bill | 11 | 7.69 % | $1,115.80 | $101.44 | 0 |
| 00002 - Promenade, Charlotte, NC | 00002 | Morris, Philip | 0 | 0.00 % | $0.00 | $0.00 | 1 |
| 00002 - Promenade, Charlotte, NC | 00002 | Lee, Spencer | 6 | 3.55 % | $697.65 | $116.28 | 0 |
| 00002 - Promenade, Charlotte, NC | 00002 | Rhodes, Barry | 9 | 5.33 % | $660.90 | $73.43 | 0 |
| 00002 - Promenade, Charlotte, NC | 00002 | Dole, John | 14 | 8.28 % | $1,437.60 | $102.69 | 2 |
| 00002 - Promenade, Charlotte, NC | 00002 | Richardson, Rudy | 4 | 2.37 % | $654.85 | $163.71 | 4 |
| 00002 - Promenade, Charlotte, NC | 00002 | Bush, Tom | 7 | 4.14 % | $889.10 | $127.01 | 0 |
| 00002 - Promenade, Charlotte, NC | 00002 | House, Tom | 6 | 3.55 % | $759.65 | $126.61 | 0 |
| 00002 - Promenade, Charlotte, NC | 00002 | Reid, Michael | 7 | 4.14 % | $698.40 | $99.77 | 0 |
| 00002 - Promenade, Charlotte, NC | 00002 | Smith, Don | 0 | 0.00 % | $0.00 | $0.00 | 4 |
| 00002 - Promenade, Charlotte, NC | 00002 | Sloan, Al | 16 | 9.47 % | $1,590.65 | $99.42 | 0 |
| 00002 - Promenade, Charlotte, NC | 00002 | Dell, Albert | 8 | 4.73 % | $783.45 | $97.93 | 0 |
| 00002 - Promenade, Charlotte, NC | 00002 | Dallas, Victor | 8 | 4.73 % | $669.10 | $83.64 | 0 |
| Total Values | 1 | 20 | 169 | 5.00% | $18,212.00 | $107.76 | 23 |

FIG. 6C

The Evaluation tabs

Evaluation "Photography" tab:

| Photography | Sales | |
|---|---|---|
| Posing Sequence Followed | 3 | |
| Pleasing Expression | 4 | |
| Eye Direction into Lens | 3 | |
| Images in Cart | 4 | |
| Composition | 3 | |
| Number of Poses Shot | 4 | |
| Body Angles at 45 | 3 | |
| Camera Angle to Customer | 3 | |
| Correct Light Settings | 3 | |
| Use of Props | 4 | |
| Attention to Detail | 3 | |
| Use and No. of Backgrounds | 3 | |
| Framing and Sizing of Pose | 4 | |
| Shoots to Sell | 3 | |
| Total Score | 47 | |
| Average score: | 3.36 | out of 5 |

Evaluation "Sales" tab:

| Photography | Sales | |
|---|---|---|
| Follows the Sales Protocol | 4 | |
| Benefits, Uses and Features | 3 | |
| Bridge Statement on Benefits | 3 | |
| Creating Special Effects | 4 | |
| Price Comparison Screen | 3 | |
| Leverage CD | 4 | |
| Leverage Special Effects | 3 | |
| Opening Price Point | 3 | |
| Closing the Sale | 3 | |
| Overcoming Objections | 3 | |
| Re-Close the Sale | 4 | |
| Upgrade the Sale | 3 | |
| Enthusiasm / Energy | 3 | |
| Sales Average | 3 | |
| Total Score | 46 | |
| Average score: | 3.29 | out of 5 |

SYSTEM, METHOD, AND COMPUTER PROGRAM PRODUCT FOR EVALUATING PHOTOGRAPHIC PERFORMANCE

BACKGROUND OF THE INVENTION

1. Field of the Invention

Embodiments of the present invention are directed to systems, methods, and computer program products for evaluating photographic performance, and more particularly to systems, methods, and computer program products for providing automatic generation of photographic performance metrics.

2. Description of Related Art

Retail photography studios, through which customers may obtain professionally-taken photographs, have existed for some time. Often, there is an expectation of a higher or different quality of photographs taken by professionals than might otherwise be produced without such professional help. This provides the motivation for utilizing a retail studio. As such, ensuring high quality photographs has always been a concern for retail photography studios.

Traditionally, the monitoring and improvement of photographic quality and performance has been a cumbersome process. Various evaluation methods have been used in the past and are still in use today. Some photographic companies have produced proof sheets, film, or video including a series of photographs from a given photography session. These images could be used to examine the performance of a photographer during a given session (e.g., the number of pictures taken with imperfect focus, the number of pictures taken with poor composition, etc.). Also, images from different sessions could be examined to determine any positive or negative tendencies in photographic performance, and to monitor improvement in technique. However, the manual review of images tends to be a labor intensive process, and as a result, this method provides only limited opportunity for systematically monitoring and/or improving photographic performance.

In more recent times, digital cameras and technology have proliferated in society. Users of digital cameras are free to take a great number of pictures in order to ultimately obtain just a few of acceptable quality with the rest being unused. The advent and growth of digital photography, with its inexpensive and forgiving nature, has increased the demands professional photographers to offer exceptional quality, both in terms of image quality and customer service, in order to attract customers. There is a need, therefore, for a method and/or system that allows for monitoring and management of photographic performance. With the existence of chains of retail photography studios, there is also a need for such a system to allow for central management of distributed retail photography studio centers.

BRIEF SUMMARY OF THE INVENTION

Embodiments of the present invention may address at least some of the above disadvantages while potentially achieving other advantages by providing a system, a method, and a computer program product for evaluating photographic performance. In this regard, a performance metric is generated, based in part on image information, which allows photographic performance to be evaluated.

In one embodiment, the present invention provides a method for automatically evaluating photographic performance. The method includes recording with a camera device one or more images during a photography session. The images are digitally stored, and image information related to the images is automatically, and in some cases manually, compiled. The image information may include sales data, such as purchase quantity and purchase price, image content data, such as data regarding use of props and data regarding expressions of subjects of the images, image capture data, such as the time elapsed between consecutive images and total number of images captured in an image capture session, and sales condition data, such as data regarding the special effects included in an image and data regarding style of presentation of images captured and being sold. At least one photographic performance metric is automatically generated using at least one of the images and at least some of the image information. The performance metric acts to facilitate evaluation of one or more aspects of photographic performance.

In one embodiment, the images are digitally stored, along with the image information, in a memory. A processor is provided in communication with the memory, the processor obtaining the image information and automatically generating the photographic performance metric. A sales device may also be provided in communication with the memory for generating at least some of the sales data and storing the sales data to the memory as part of the image information. The camera device may be a digital camera that automatically generates some of the image information associated with the images recorded by the digital camera. Some image information may be selectively entered using an input device. Performance metrics and associated images may be selectively displayed with a display device in communication with the memory.

Another aspect of the present invention provides a system for automatically evaluating photographic performance. The system includes at least one digital camera configured to record one or more digital images during a photography session. Also included in the system is at least one database configured to obtain and store both digital images from the digital camera and automatically compiled image information associated with the digital images. A processor is configured to obtain the digital images and image information and to automatically generate at least one photographic performance metric using at least one of the digital images and the image information. The performance metric acts to facilitate evaluation of one or more aspects of photographic performance, and may be stored in the database in association with the digital images and image information.

In another embodiment, the processor may be located, along with a central database, remotely from the database. The central database is configured to selectively upload the digital images and digital information from the database via a network. In another embodiment, multiple databases are connected via a network to a remotely located central database, thereby forming part of a remote evaluation system. The central database is configured to selectively upload the digital images and digital information at efficient intervals from the databases. The remote evaluation system may also include a display device in communication with the central database for selectively displaying stored images, image information associated with stored images, and the performance metrics generated by the processor.

Another aspect of the present invention is directed to a computer program product for facilitating the automatic generation of photographic performance metrics. The computer program product includes a computer-readable storage medium having computer-readable program code portions stored therein. The computer-readable program code portions include a first executable code portion for automatically compiling image information related to at least one digitally stored image. A second executable code portion is also included, the second code portion automatically generating at least one photographic performance metric using at least one of the digitally stored images and the automatically compiled image information related to the stored images. The generated performance metric facilitates evaluation of one or more aspects of photographic performance, as discussed above. Another executable code portion allows storing data from a device, such as a sales device, a user input device, a digital camera, and/or one or more remote memories connected via a computer network. Other executable code portions may allow for receiving and compiling user inputted image information via a user input device, selectively displaying with an associated display device a performance metric and an associated image, and storing images from a digital camera.

BRIEF DESCRIPTION OF THE SEVERAL VIEWS OF THE DRAWINGS

Figure 1:
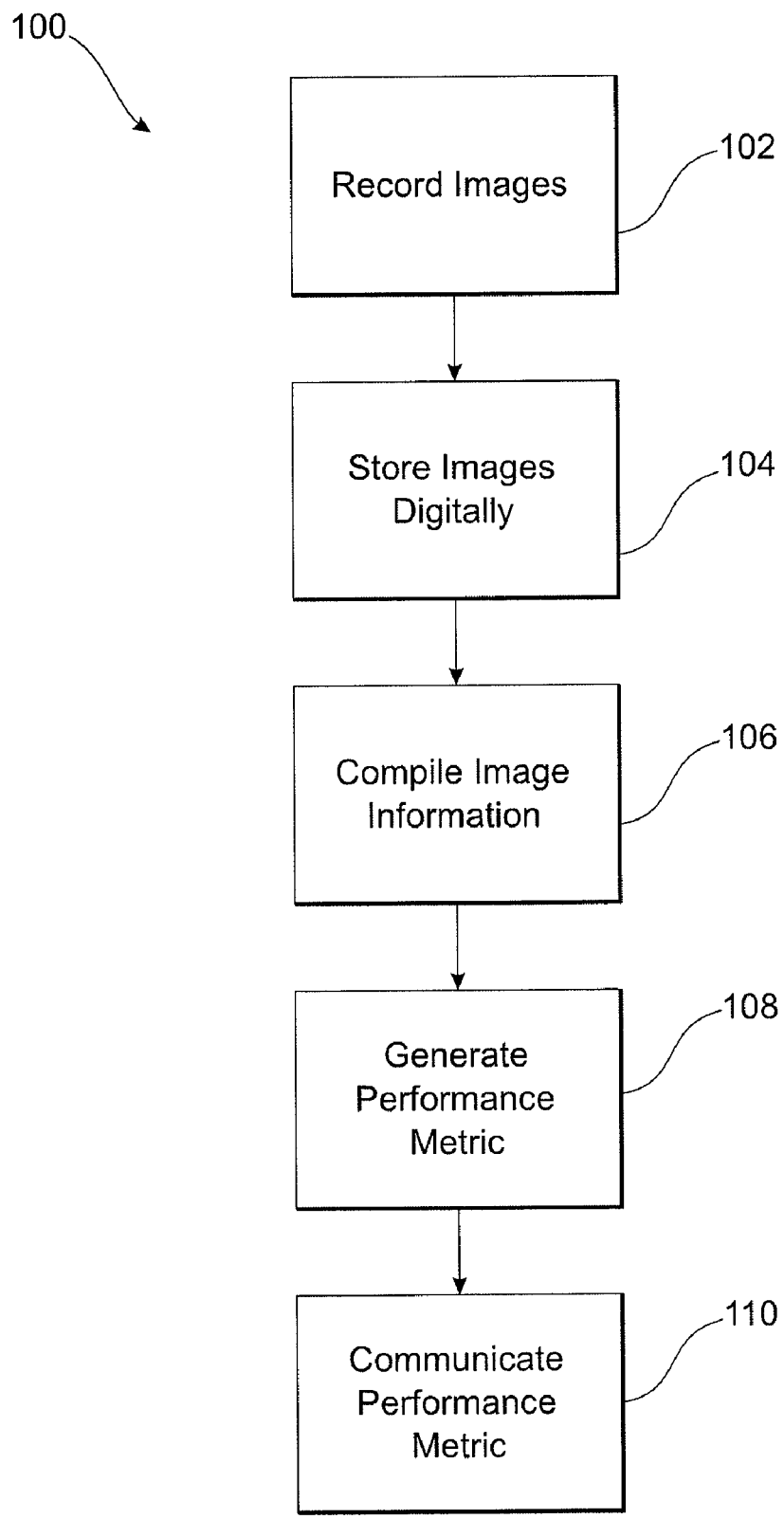
Figure 2:
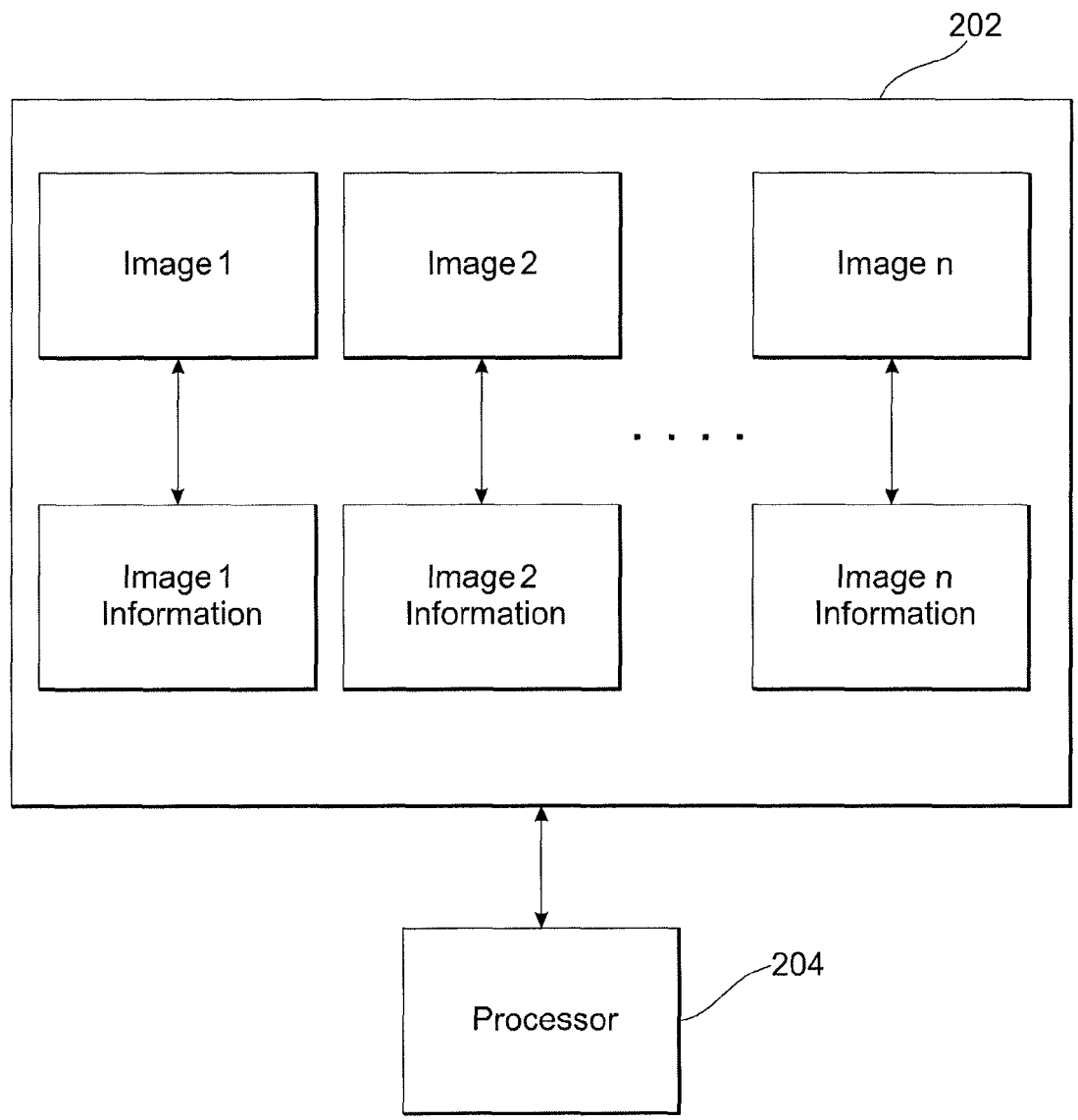
Figure 3:
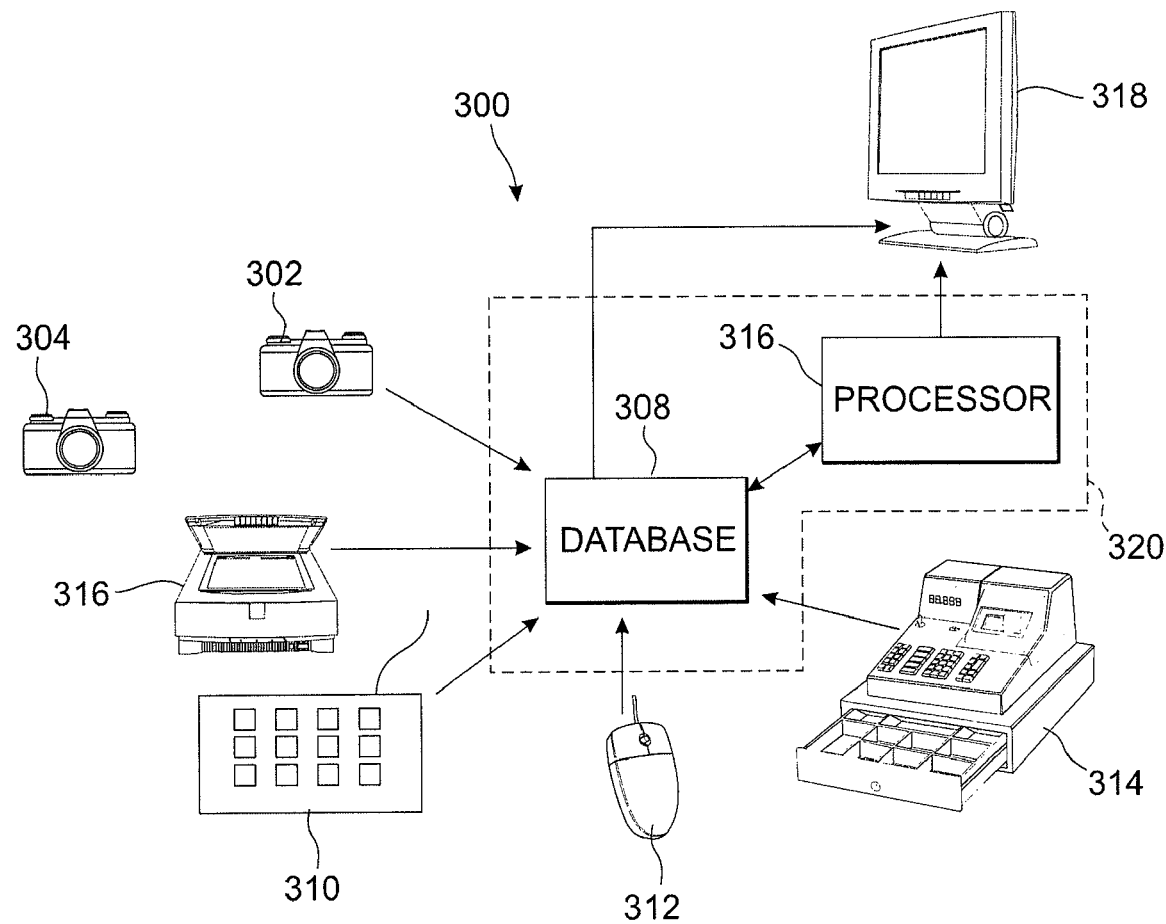
Figure 4:
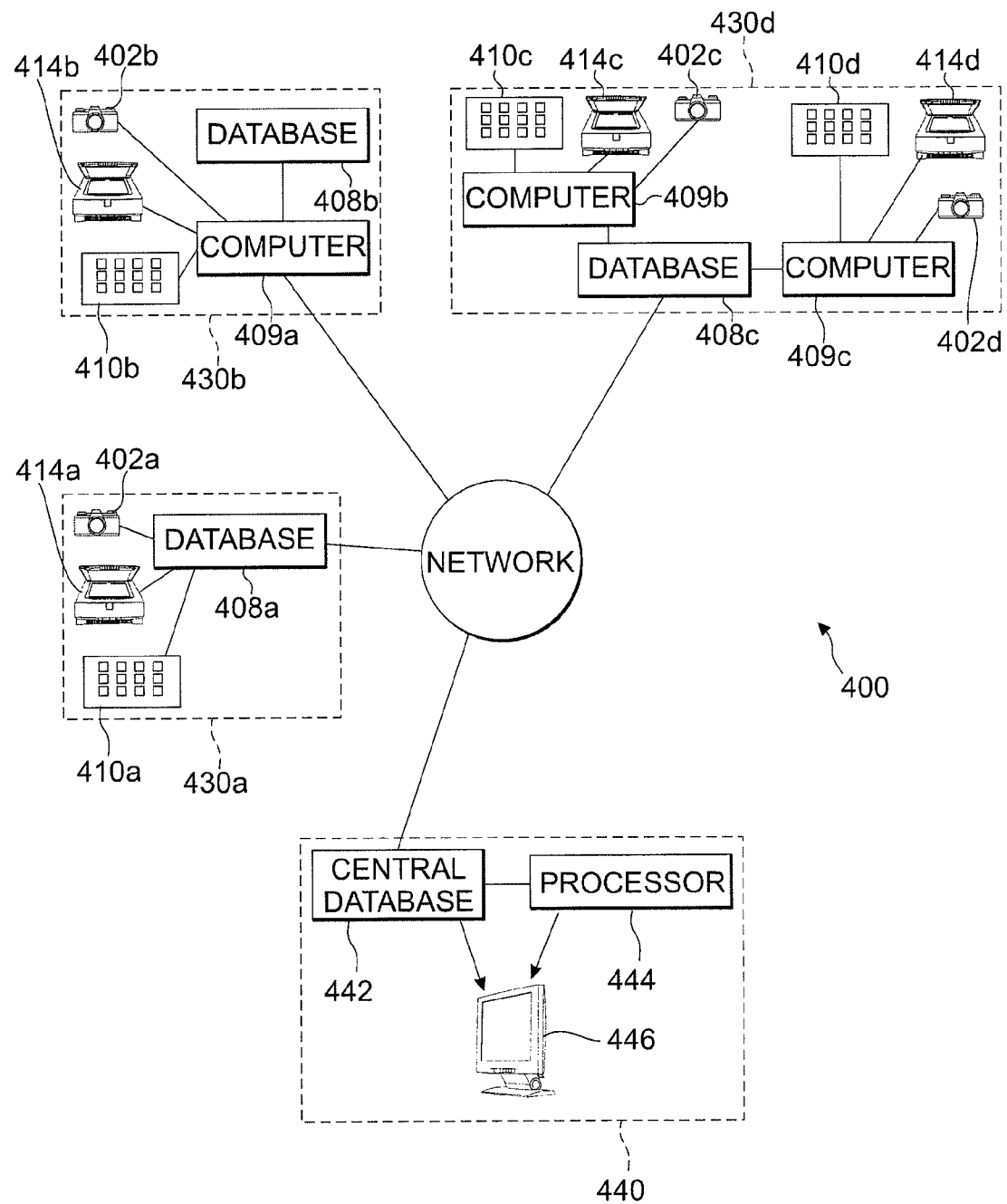
Figure 5:
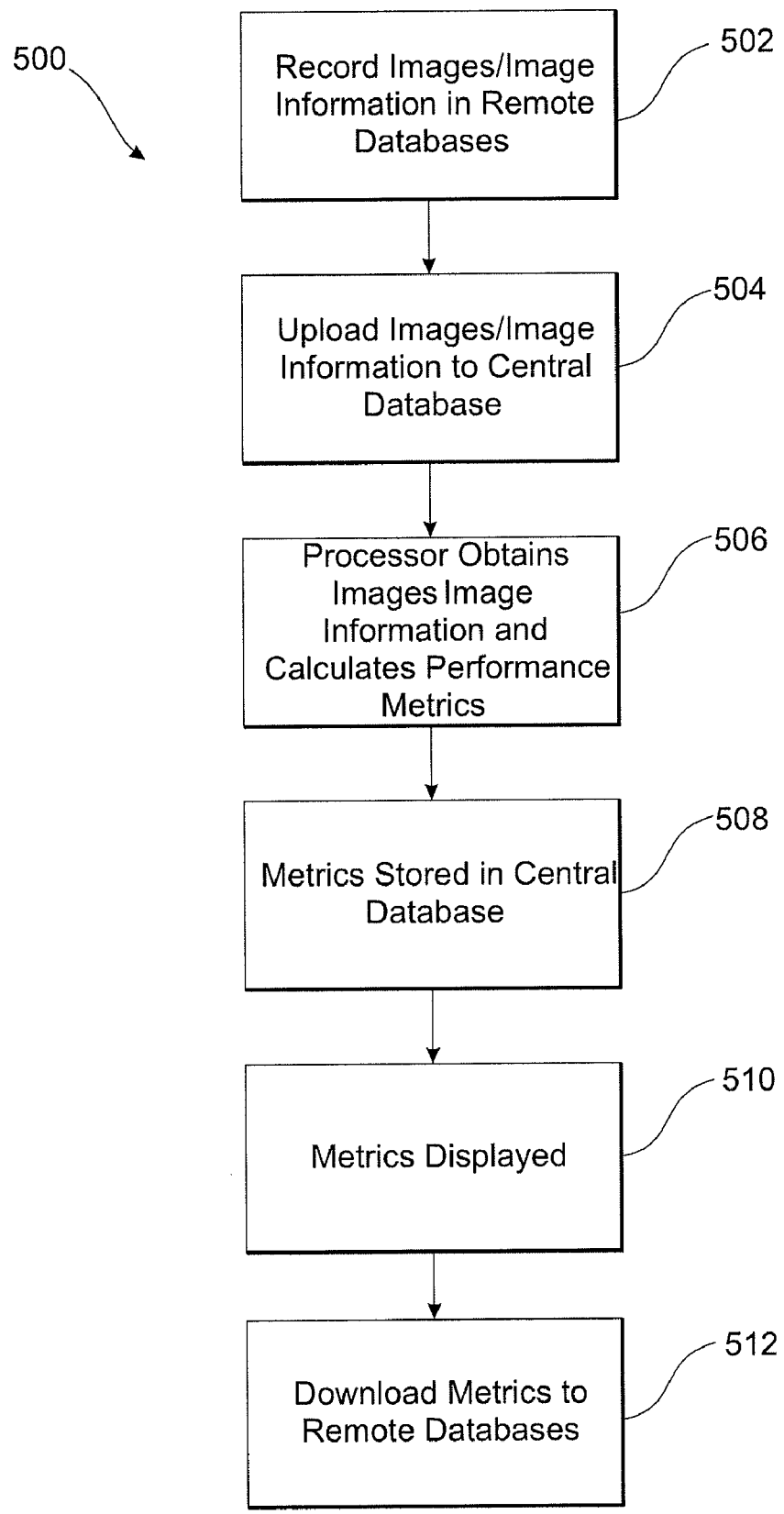
Figure 6A:
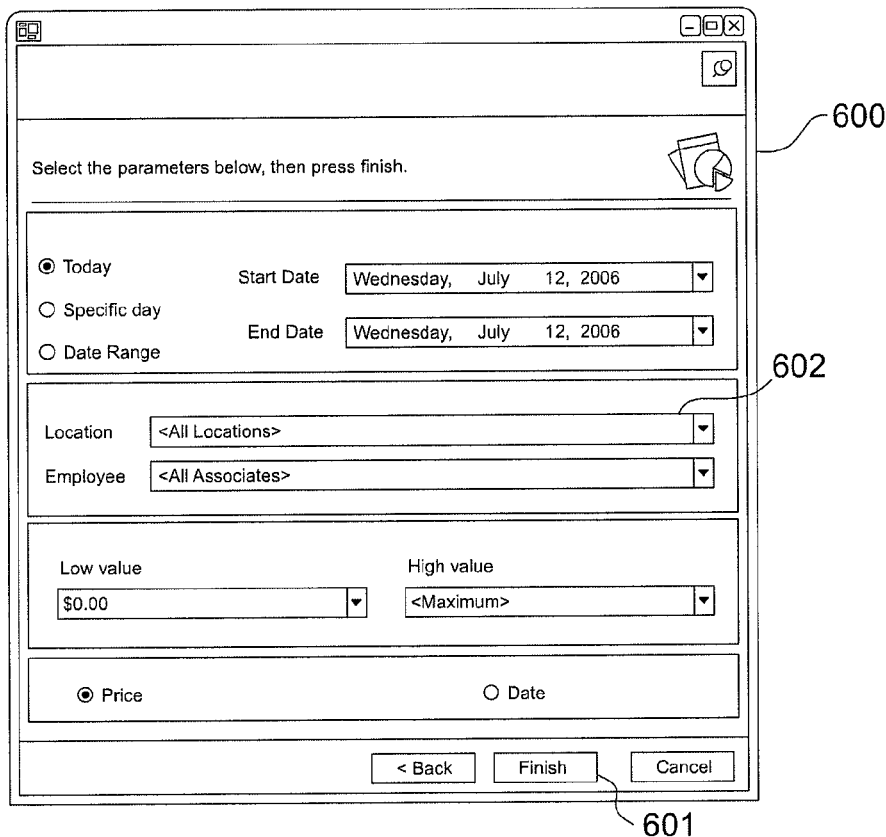
Figure 6B:
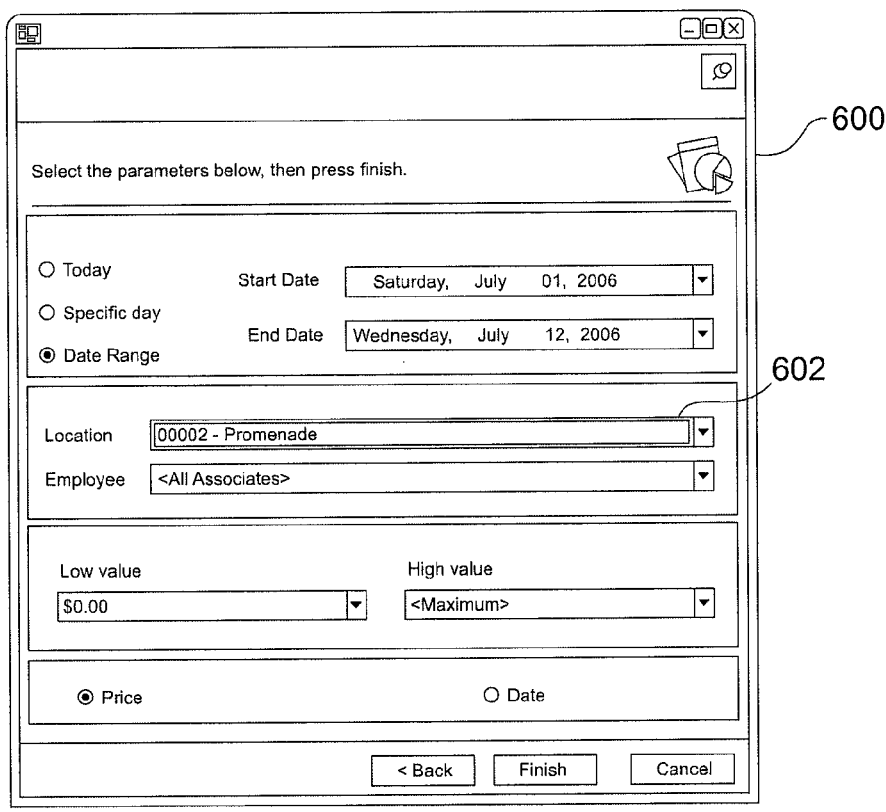
Figure 6D:
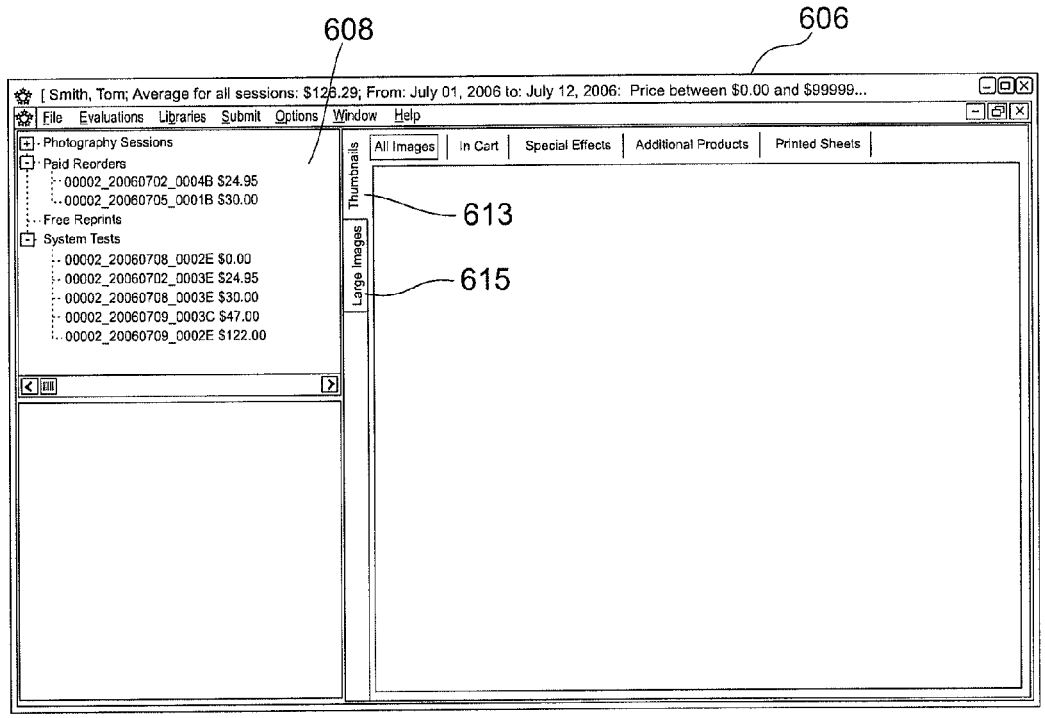
Figure 6E:
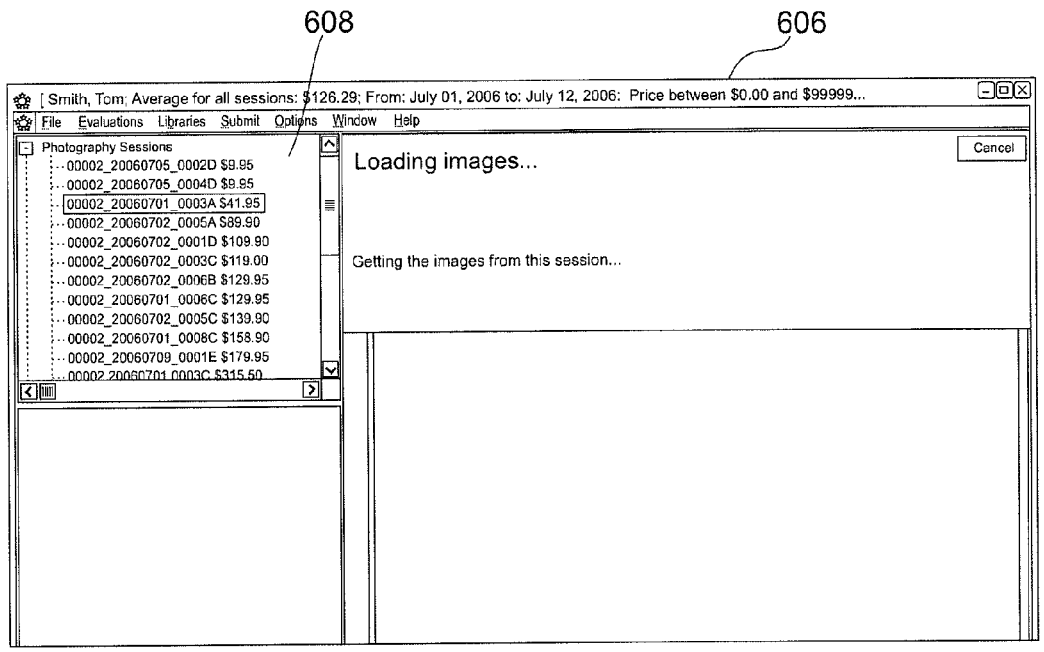
Figure 6F:
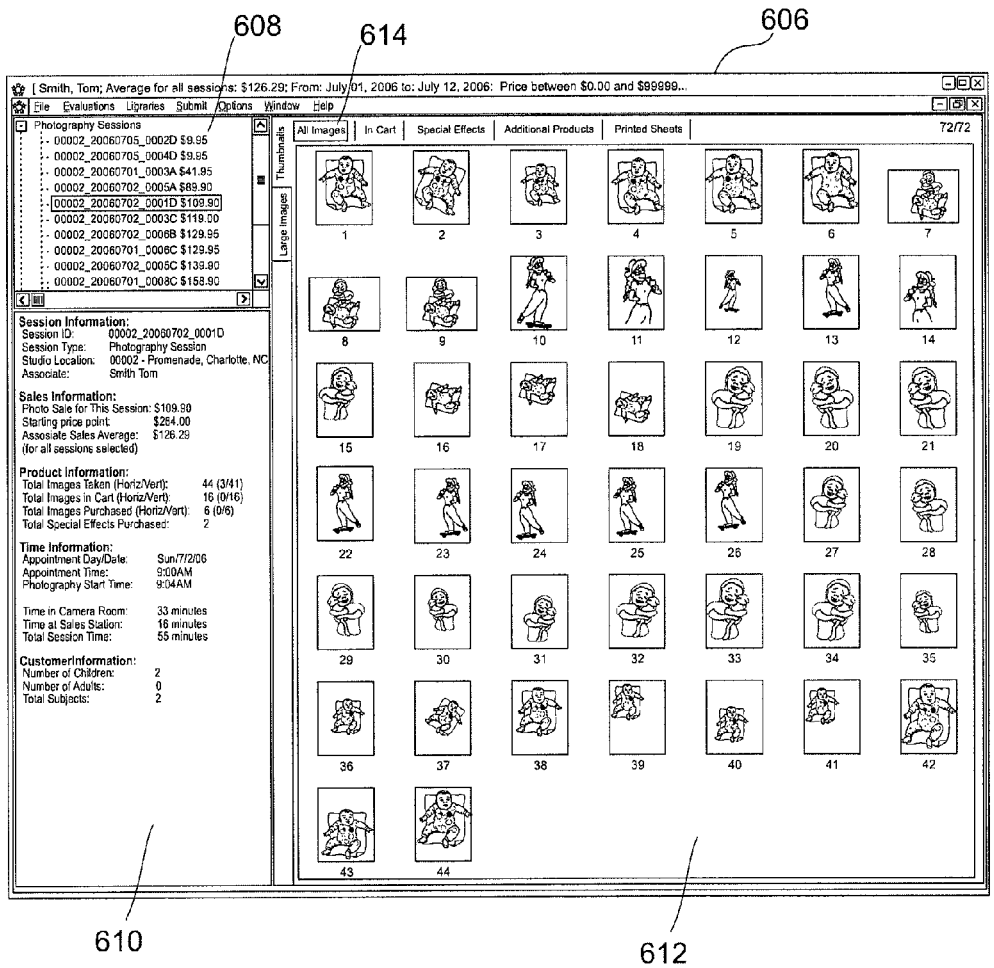
Figure 6G:
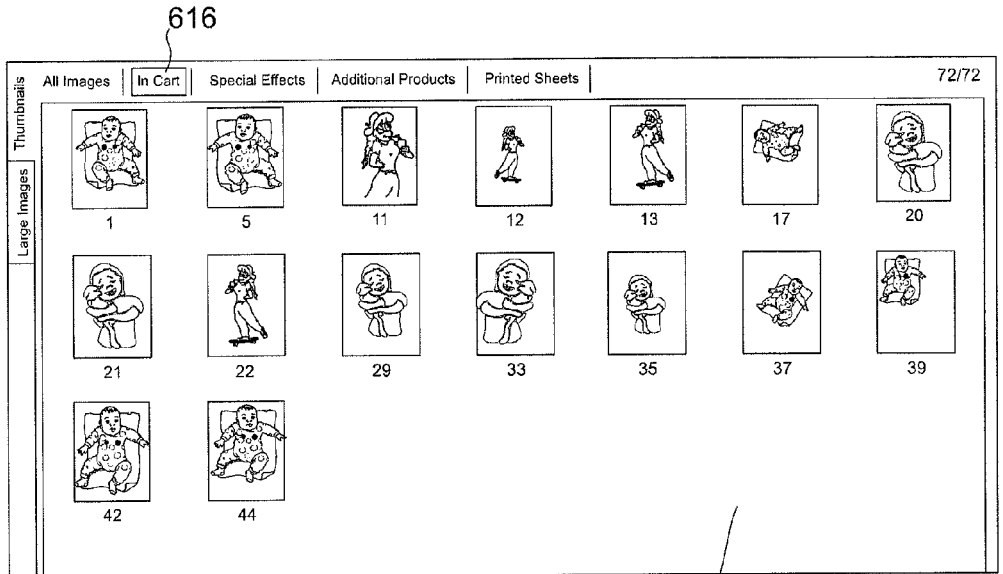
Figure 6H:
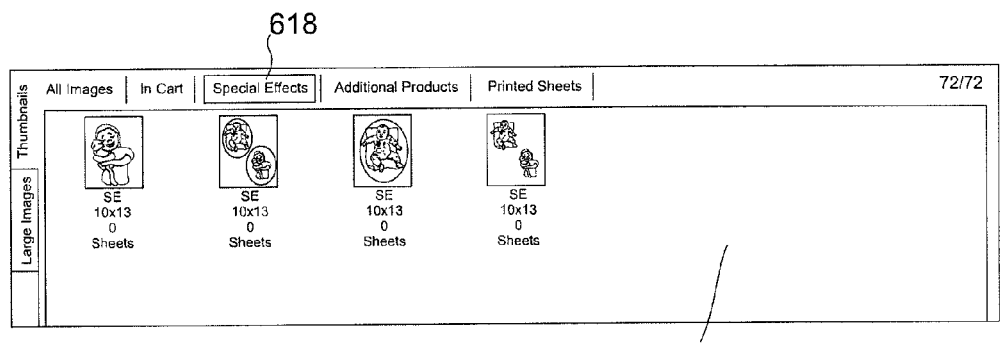
Figure 6I:
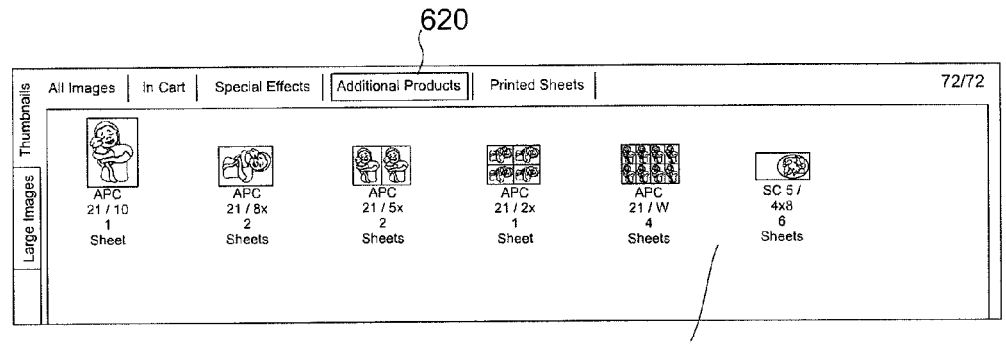
Figure 6J:
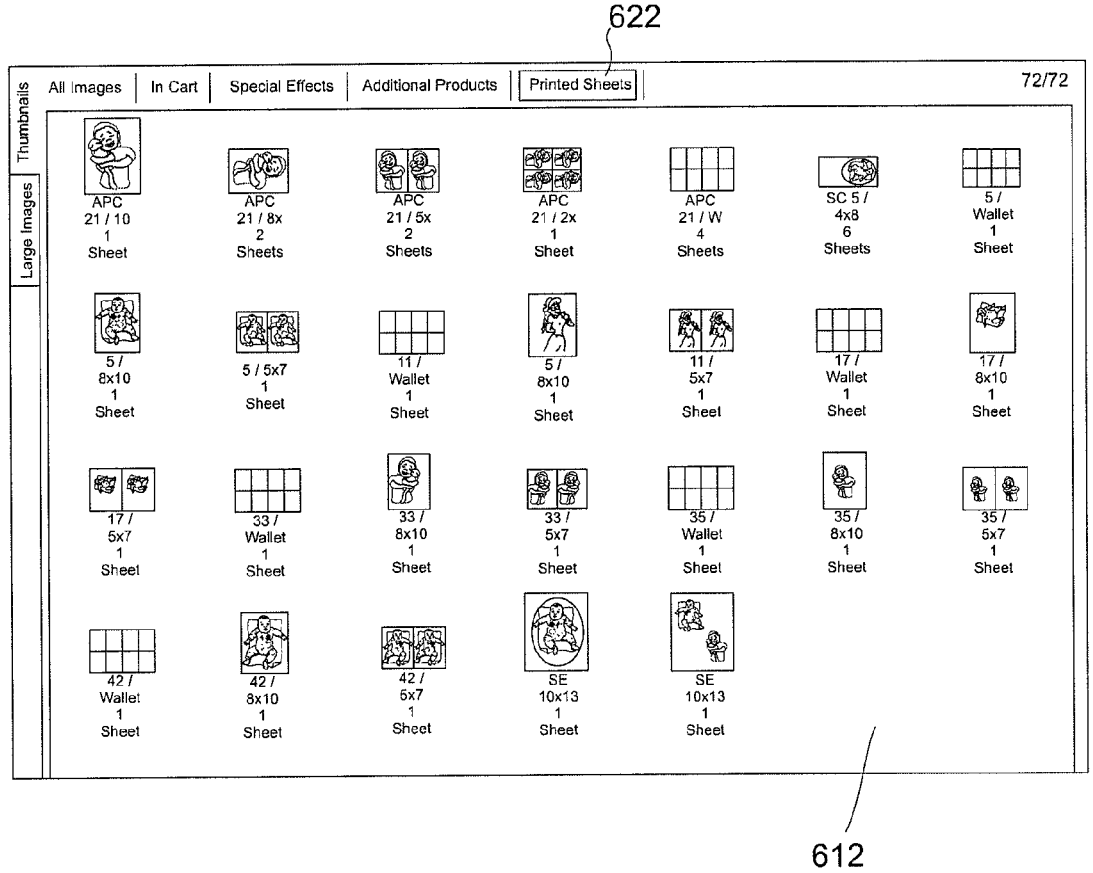

Having thus described the invention in general terms, reference will now be made to the accompanying drawings, which are not necessarily drawn to scale, and wherein:

FIG. 1 is a flowchart representing a method for automatically generating photographic performance metrics according to an embodiment of the invention;

FIG. 2 is a schematic representation of a system and method for automatically generating photographic performance metrics in accordance with an embodiment of the present invention;

FIG. 3 is a schematic representation of a system for automatically generating photographic performance metrics, the system being constructed in accordance with an embodiment of the present invention;

FIG. 4 is a schematic representation of a photographic performance evaluation system including multiple independent photographic locations and a remote evaluation system, the photographic performance evaluation system being constructed in accordance with an embodiment of the present invention;

FIG. 5 is a flowchart representing a method for using the system of FIG. 4; and

FIGS. 6a-6l are a series of graphical user interfaces exemplifying the sequential operation of one implementation of an embodiment of the present invention in which software is utilized to carry out the photographic performance evaluation from a remote location with respect to the location at which at least some of the images were captured

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Referring to FIG. 1, therein is a flowchart representing a method 100 for evaluating photographic performance, the method being in accordance with an embodiment of the present invention. Generally, the method 100 allows for evaluation of photography sessions through the automated generation of one or more performance indicators. It is noted that the term "photography session," as used herein, may include any or all of the activities associated with a retail photography experience, including capturing images, presenting images for sale, selling images, etc. Along the same lines, references herein to a "photographer" may include any of those persons/activities associated with the production and/or distribution of images, and may not involve the capturing of images.

At step 102, one or more images are recorded with a digital image generation device, such as a digital camera device; these images are stored in a digital format in step 104. In one embodiment of the method 100, the camera device is a digital camera (either still or video), in which case steps 102 and 104 are carried out together. However, in another embodiment, images are recorded in a non-digital format (e.g., with an analog video camera or with a conventional film camera) and then converted to a digital format using, for example, an analog-to-digital converter or a scanner.

At step 106, some of the information related to the stored images is automatically compiled; other portions of image information may be manually added and/or compiled. This image information can include one or more of the following, as applied to at least one stored image: sales data, image content data, image capture data, and/or sales condition data. Image sales data can include data regarding the quantity of images purchased (e.g., listed by an image indicator such as an image number and the number of images purchased), data regarding the sizes of purchased images (e.g., listed by an image indicator, a size indicator, and a quantity), data regarding the type and/or amount of any special effects purchased, data regarding the purchase of image reprints (e.g., listed by image indicator, original purchase quantity, and subsequent purchase quantity), data regarding customer return for purchasing previously unpurchased images (e.g., listed by image indicator, initial purchase of other images, and subsequent purchase quantity), data regarding customer return for capturing new images (e.g., listed by image indicator, original purchase quantity, and subsequent dates of return, perhaps along with purchase quantities related to subsequent visits), and data regarding the price paid for purchased images (e.g., listed by image indicator and a dollar amount).

Image content data can include data regarding the orientation of an image (e.g., listed by image indicator and the aspect ratio of the image), data regarding the rotation of an image, the magnification level/zoom setting of an image, data regarding the size, storage requirements, and/or resolution of an image, data regarding the backgrounds and the use of props in an image (e.g., listed by image indicator and scene displayed in the background, optionally indicated by a standardized scene indicator), data regarding the expressions, body angles, and relative placement of the subjects of an image (e.g., listed by image indicator and a standard deviation from 45 degrees for all of the subjects of the image), data regarding the relative positioning of the camera and any image subjects (e.g., listed by image indicator and the distance between the center of the image area and the position of a subject), data regarding the posture of image subjects and the variety of subject poses amongst all of the images of a photography session (e.g., listed by image indicator and an estimate of body curvature of a subject), and data regarding the number of subjects included in an image or the choice and grouping of subjects from amongst available subjects.

Image capture data can include the number and relation of available image subjects, the time elapsed between capturing consecutive images (e.g., perhaps calculated by recording a time of capture for each image, listing images sequentially and by photography session of capture, and determining an average delay time and a standard deviation), the time required to complete an image capture/photography session (e.g., listed by image capture session indicator and total time), the total number of images captured in an image capture/ photography session, the time and/or date of image capture (and/or some other indicator of a photo session), and the identity and physical location of the photographer. Finally, sales condition data can include data regarding the special effects included in an image (e.g., use of soft or blurred edges, the grouping of different images, the use of color tones (black and white, sepia, true color), or graphical overlays of other images/graphic elements (multiple exposures, borders, cards)), data regarding the style of presentation of the images captured and being offered for sale (e.g., information regarding whether images were offered in sets, in larger/smaller sizes, or which images captured in a photography session were presented to the customer in hard copy form), and data regarding the preliminary selection of an image.

Some or all of the image information, along with the images to which that information applies, is utilized at step 108 for automatically generating at least one photographic performance metric, which is optionally communicated, for example, by displaying the metric, at step 110. Preferably, the generated performance metrics provide a concise indication of photographic performance, thereby facilitating the evaluation of photographic performance and allowing for focused efforts at improving photographic performance. Images may be viewed, either separately from, or together with, the communication of the performance metrics, further enhancing the ability to quickly and easily evaluate photographic performance. However, other performance metrics may be generated and used for other purposes. For example, performance metrics may be used to evaluate the performance of a retail photography location as a whole, to gauge the market for photography sales in a locality or region, or to identify factors that contribute to success or failure in producing marketable images. As used herein, the phrase "concise indication of photographic performance" should be understood to mean some indicator that includes less than all of the information associated with images of a photography session, which may or may not be associated with a full commentary regarding those images. The use of concise indications of photographic performance does not prohibit consideration of all of the images of a photography session and a full discussion thereof, but simply provides an alternative, and potentially less protracted and/or more quantitative, means for judging photographic performance. It is noted that in some cases, image data may relate to a photography session rather than to an individual image. For example, data may be collected regarding the variety of subject poses displayed in a photography session, or the total time required for capturing all of the images. These data may be associated with the photography session generally, with each of the images in the photography session, or both.

As mentioned above, some or all of the image information and/or images may be used in generating the performance metric. Which image information of the set of all image information is used in calculating performance metrics depends on the desired objectives in employing the evaluation process. Objectives and metrics can be tailored to specific applications, with the choice of image information for use in calculating the metrics depending therefrom. As an example of the automatic generation of a metric and a corresponding choice of specific image information, consider a potential evaluation objective of determining an optimal number of distinct subject poses employed during a photography session for maximizing the sale of images resulting from that session. With respect to this objective, a pertinent performance metric might be the relationship between the number of poses and the total sales price from a session. The corresponding image information utilized in calculating the performance metric would then be the number of different subject poses employed during a session and the price paid for the images ultimately purchased from the session. This information could be used to determine a pose number-sales price data point for the session at issue. This process could then be repeated for a number of photography sessions, producing a number of pose number-sales price data points that can be used, for example, to fit a curve in pose number-sales price space. The performance metrics would be, for example, the curve fitting parameters, concisely indicative of the relationship between the pose frequency and sales prices. This metric might also be correlated to the images from the photography session, such that the images could be reviewed when the metric is reviewed.

In the above example, the objective in performing the evaluation was to discern a standard for optimizing photographic performance. However, the method can also be used with an objective of assuring proper compliance with established photographic performance standards. For example, drawing on the previous example, an established standard may indicate that a photography session produces the highest frequency of purchased images when the session involves at least 12 distinct poses of the subjects. In that case, the desired image information would include the total number of poses utilized during the session. This could then be compared to the session pose number standard (here, 12), rather than determining a standard from the data. In this way, a photographer's systematic performance relative to set goals may be quantified and evaluated. Sales data could also be correlated to the performance metric to determine whether the sessions within the standard produced a higher frequency of sales, as expected. If not, reasons for such results can be investigated and the appropriate level for the standard could be revisited.

An embodiment of the evaluation method of the present invention can also be used to evaluate performance in the absence of standards. For example, total sales can be a performance metric, and this performance metric may have no desired bounds. Rather, it may always be desirable to simply increase sales and, therefore, this metric can be viewed in conjunction with session images in assessing ways to increase sales. Data can be compiled across various photography sessions for each photographer to determine ways in which each photographer and/or sales associate can improve performance, or to identify the higher performing photographers in order to analyze the parameters that contribute to their success. It is noted that this example, as well as both prior examples, involved sales information to some extent. The present invention does not require that a performance metric involve sales information. However, in a commercial setting, sales information will typically be of significant importance, and as such, in one embodiment of the present invention, all other types of data are correlated with sales data in order that the factors most affecting image sales might be determined. Other performance metrics may include, but are not limited to, numbers of images taken in a photography session, photograph timing, number of ways available subjects are re-combined into smaller sub-groupings (i.e., family, parents, children, individuals).

There are a number of ways in which the above-described method for automatically evaluating photographic performance could be implemented. Referring to FIG. 2, in one embodiment, a memory 202 is provided for storing digital images. This memory could be, for example, a computer readable memory, such as a random access memory (RAM), a read only memory (ROM), a programmable ROM (PROM), an erasable PROM (EPROM), or an electronically erasable PROM (EEPROM), or could be some other type of memory. The memory 202 could be a single physical component, or could be distributed between multiple physical memory devices that aggregate to form memory 202. Also stored in memory 202 is the image information, in a manner that allows the image information to be correlated with the associated images. For example, each image might be assigned an indicator number, and related image information could be stored in a file identified by the same number. Alternatively, each image might be associated with a specific database within which associated image information is stored. A processor 204 in communication with the memory 202 obtains the image information data and automatically generates one or more photographic performance metrics, as exemplified below. The processor 204 can be any computing device, including a microprocessor or a discrete group of circuitry and components.

FIG. 3 illustrates a system 300 for automatically evaluating photographic performance in a manner in accordance with the above-described method 100 (FIG. 1). A digital camera 302 captures one or more digital images during a photography session. Alternatively, images may be captured with a non-digital camera 304 and then digitized with a scanner 306. The digital images are stored by a database 308, along with image information associated with the digital images. The images may be transferred directly from the digital image generation devices via a physical connection (e.g., a dedicated line or via the Internet), a wireless connection, or through the use of removable media, or may be transferred indirectly via one or more intermediate computers/devices. Database 308 may be located entirely in one area, or can be distributed between several physical devices and/or locations. Some image information can be inputted into the database 308 through the use of user input devices, such as a keyboard 310, a mouse 312, or another computer, connected in communication with the database and then automatically compiled into a format that allows potential extraction of a performance metric. Some of the image information may be gleaned from viewing images on a display 313 that is in communication with database 308 or with one or more of the image generation devices (or other intermediate storage devices that may be included in system 300). User input devices might also be appropriate, for example, for assembling groups of pictures for potential sale and for adding special effects to pictures being offered for sale, both of which are ultimately represented as image information. Other tasks may also be performed with these devices, such as the manual entry of other (possibly subjective) image information, yielding other forms of representative data.

Other image information, such as the times that images are captured and the length of a photography session, may be obtainable directly from the digital camera 302, either automatically, when the camera generates the information or at specified intervals thereafter, or via user commands. Still other image information is obtained from other devices placed in communication with database 308. For example, a sales device, such as a digital cash register 314 or a separate computer, can be connected in communication with the database to automatically store sales data for one or more stored images. It is noted that, in some cases, a general purpose computer may be utilized to extract the image information from various types of files within which the information is embedded. For example, image information may be embedded in an image file created by a digital camera in taking an image, such as the information (e.g., shutter speed, etc.) embedded in an XF Image File, this information being extractable for subsequent use in determining metrics.

Yet other image information may be generated by a processor 316 in communication with database 308, which operates on the data making up the digital images. For example, the processor can be used to judge the focus or contrast present in a stored image, and the focus or contrast levels can be image information that is subsequently stored to the database. Alternatively, the processor may be utilized to determine, via image recognition algorithms, the content of an image, such as the color of the background, the number of subjects, the angle of subjects in an image, and the relative position of an image subject and the camera lens. All of this information can be stored to database 308.

The above described types of image information all generally result from the photographic process underlying the information, and the information is amenable to being automatically compiled and/or organized for subsequent processing. However, in some cases, other types of data may also be useful in evaluating photographic performance. These data may include the enthusiasm of the photographer in selling images, the ability of a photographer to overcome objections to purchasing images, and the language used by a photographer in attempting to sell images. Further, some of the forms of image information discussed previously in terms of automatic compilation, such as judgments regarding the expressions of image subjects, may be equally or more amenable to manual entry and/or compilation. These varieties of image information can be compiled and inputted into the database 308 through the use of user input devices, supplementing the automatically compiled image information. The entered data may or may not be amenable to automatic compilation (e.g., a comment such as "good salesmanship" may not be amenable to automated compilation, as opposed to a numerical rating of salesmanship abilities).

The processor 316 obtains the digital images and the image information from the database 308. One or more photographic performance metrics are automatically generated using at least one of the digital images and the image information. For example, processor 316 can relate the total number of images captured to the average sales amount associated with the respective images. Performance metrics could include the rate at which image sales amounts change as the total number of captured images increases, or the maximum point in a sales amount-image number plot. Establishing such a relationship would also facilitate subsequent visualization via a graph. As another example, processor 316 can relate photographer identity to sales amounts of images captured in various photography sessions, possibly yielding such performance metrics as "frequency of sales amounts above $200.00" or rate at which sales amounts increase for a given photographer over time.

As seen earlier, a digital image may simply be associated with a metric, or, the image may be analyzed or processed in producing the metric. The performance metrics can be used immediately for facilitating evaluation of photographic performance. Along these lines, system 300 may include a display device 318 in communication with the processor 316 and/or database 308 that displays performance metrics, either with or without associated images and image information, to a user. Alternatively, the database 308 may be configured to store the performance metrics in association with the digital images and image information for use at a later time. In some cases, processor 316 and database 308 may be embodied in a single desktop computer 320, although generally the components of system 300 may be arranged in any way desired.

As is evident from the above description, data for generating photographic performance metrics may be provided to the database from multiple sources, many producing digitized data. More generally, embodiments of the present invention advantageously make use of the copious amounts of data made available by the increased incorporation of digital technology into both the photographic and sales processes to compile and analyze greater amounts and types of data. In so doing, a more rigorous and insightful analysis of photographic performance is potentially enabled than would otherwise be possible.

Another embodiment of the present invention is represented in FIG. 4. Therein is shown a photographic performance evaluation system 400 including multiple independent photographic locations 430a-c and a remote evaluation system 440 located remotely from one or more of the independent photographic locations. The independent photographic locations could be, for example, retail photography stores. Each of the independent photographic locations 430a-c includes one or more digital image generation devices, such as digital cameras 402a-d, one or more digital cash registers 414a-c, and one ore more keyboards 410a-c or some other/additional user input device. All of these devices provide data to associated remote databases 408a-c, either directly, via direct communication or the transfer of removable media, or indirectly through one or more separate computers 409a-c.

The remote evaluation system 440 includes a central database 442 connected to the remote databases 408a-c via a network, and digital images and digital information may be selectively uploaded, either automatically or on command, at efficient intervals from the remote databases 408a-c to the central database 442. A processor 444 communicates with central database 442, obtaining the images and image information uploaded into the central database and using them to generate photographic performance metrics. The remote evaluation system 440 can also include a display device 446 in communication with the central database 442 and/or processor 444 for visualization of any or all of stored images, image information associated with stored images, and the performance metrics generated by the processor.

It is noted with respect to the systems of FIGS. 4 and 5 that there is no single required arrangement of the various physical components of these systems. While the systems have been described with respect to exemplary embodiments, it should be understood that the involved components may be distributed in a variety of ways. For example, each computer or device in a system may include its own memory, each individual memory constituting one portion of a "database." Processing and/or storage may be distributed throughout a system, at discrete points within a system, or may be completely centralized. Each "computer" or other device may be made up of several discrete components that may or may not be physically integrated or even located proximally to one another. When components are physically separated, such components may communicate via dedicated communications channels, such as via hardwired or Bluetooth or other wireless connections, or via communications networks such as the Internet or a wireless network. Such communications may be initiated by either participating component/entity; that is, communications may be initiated by the proactive sending of information or by a request for the information.

FIG. 5 is a flow chart representing in more detail the operation of an embodiment 500 of a method and program product of present invention, for example, for use with the system 400 of FIG. 4. At step 502, digital images and associated image information are recorded in remote databases 408a-c. The images and image information could come directly from digital cameras 402a-c and/or other devices, or could be inputted by a user using a user input device, such as a keyboard 410a-c or a card reader accepting removable media, or both. The remote databases may act to compile the images and image information for subsequent processing, or may simply store the data.

At step 504, images and image information are uploaded to central database 442. This could be done upon a user command, or could occur automatically at specified intervals. At step 506, processor 444 obtains the images and associated image information and uses these to calculate photographic performance metrics. The metrics can be calculated automatically whenever data is uploaded to the central database, or on command from a user. Often, these metrics will include the number of images sold and the sale price, although other metrics may also be utilized. These metrics are stored in the central database at step 508.

At step 510, the calculated metrics are displayed with a display device 446. This allows a user to review the metrics and to look for trends in the data and metrics. A user might also wish to display the images associated with the metrics, as well as the image information. This could potentially allow the user to draw other conclusions from the data that are difficult to quantify automatically. Because the metrics pertain to photographic performance at a range of photographic locations, a user using the remote evaluation system 440 can manage performance across multiple independent sites. Further, at step 512, the metrics, and possibly the underlying data and images, can be optionally downloaded to the remote databases 408a-c in order to allow them to be further reviewed/utilized at the independent photographic locations 430a-c.

Referring to FIGS. 6a-l, therein are shown a series of graphical user interfaces exemplifying the sequential operation of one implementation of an embodiment of the present invention in which software may be utilized to carry out the photographic performance evaluation from a location that is possibly remote with respect to the location at which at least some of the images were captured. This would be useful, for example, in facilitating central management of a chain of retail photography studios. An introductory window 600 allows a user to select a photographer (employee) and/or session for evaluation. To facilitate selection, photographers can be sorted based on a number of different parameters, such as the dates of performance to be evaluated, the name of the photographer to be evaluated, the location of the photography studio in which the photographer works, and/or the amount of image sales generated in a photography session.

Once the selection process related to introductory window 600 is complete and the "Finish" button 601 is selected, appearance is prompted for a window 604 containing all of the photography sessions consistent with the criteria specified in introductory window 600. For example, specifying a photography studio location ("00002-Promenade") in selection box 602 causes a selection window 604 to appear, selection window 604 displaying the names of all of the photographers working at the chosen location, associated with which are indicators for all of the photography sessions associated with those photographers. Selecting a photographer from the selection window 604 prompts a session viewer window 606.

The session viewer window 606 includes a session tree area 608. The session tree area 608 includes a listing of all of the photography sessions of the chosen photographer, from which a specific session for evaluation can be selected. Area 608 also includes a listing of other stored information, including image reorders, image reprints, and tests conducted by the selected photographer. Once a specific photography session is selected for review, the performance metrics are displayed in the session statistics window 610. In the embodiment shown in FIG. 6f, the performance metrics include "photo sale for this session," "starting price point" (the price to purchase images preliminarily selected by a customer), "associate sales average (for all sessions selected)," "total images taken," "total images selected," etc. In other embodiments, other performance metrics could be included in session statistics window 610 as desired, or the displayed metrics may be selectable by the user. In yet other embodiments, multiple sessions can be selected for generating performance metrics related to photographic performance over a range of time, over a range of locations, or both. When a session has been chosen from the session tree, the images associated with that photography session can be selectively displayed in the image area 612 by choosing the "All Images" tab 614 in the session viewer window 606. This allows a user to visually review the session images and the performance metrics simultaneously. The "Thumbnails" button 613 and "Large Images" button 615 allow images to be viewed either in a reduced of full size, respectively. The prior may be preferable in order to make general statements about a photography session as a whole, while the latter may be preferable for reviewing the details of images.

Other tabs are available in the session viewer window 606 that allow other visual materials to be reviewed. For example, the "In Cart" tab 616 allows visualization in the image area 612 of the images chosen by a customer for potential purchase from amongst all of the images captured in the session. The "Special Effects" tab 618 allows visualization in the image area 612 of the images offered for sale by the photographer after adding special effects to the image. The "Additional Products" tab 620 allows visualization in the image area 612 of the various formats in which images were offered for sale by the photographer (e.g., as part of a holiday card, integrated into a calendar, etc.). Finally, the "Printed Sheets" tab 622 prompts display in the image area 612 of the sets of images printed for potential and/or actual sale to a customer. Each category of images allows a user to evaluate the photographic process, from the capture of images through the conclusion of a sale, and then through the time following sale using the "Paid Reorders" option in the session tree area 608.

Also available is the "Evaluation" tab 624, with associated "Photography" and "Sales" sub-tabs. Each of these sub-tabs serves a similar purpose, which is described with reference to the Photography tab. Each of the categories included under the "Photography" tab may be associated with both a numerical rating 625 and comments. The numerical rating 625 may be automatically generated based on analysis of one or more photography sessions, or may be manually entered. Comments would typically be manually entered by selecting an icon 627 associated with a category (such selection, for example, prompting a text editing tool), although automated messages might also be accessed in some cases by choosing icon 627. The categories and ratings/comments can then be recalled from a remote location, allowing this information to be utilized in photographer performance evaluation along with the automatically compiled data and the session images. Although a variety of categories are shown in FIGS. 6k and 6l, it should be appreciated that the number and type of categories may be varied depending on the application and user.

FIG. 1 is a flowchart of a method according to exemplary embodiments of the invention, and this flowchart is also representative of a system and program product according to exemplary embodiments of the present invention. It will be understood that each block or step of the flowchart, and combinations of blocks in the flowchart, can be implemented by various means, such as hardware, firmware, and/or software including one or more computer program instructions. In this regard, the computer program instructions which embody the procedures described above may be stored by a memory device of a computing device, such as the control server or the portals, and executed by a built-in processor of the computing device. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. For example, the application has often referred to a photographer. However, in another embodiment of the present invention, images of a subject can be captured automatically, and then offered for sale/sold by a sales associate, while still employing the systems and methods introduced above. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. Method for automatically evaluating photographic performance, said method comprising:
   recording with a camera device one or more images during a photography session;
   digitally storing said images;
   automatically compiling image information related to said images; and
   automatically generating at least one photographic performance metric using at least one of said images and said image information, said performance metric facilitating evaluation of one or more aspects of photographic performance,
   wherein said image information includes sales data for at least one stored image and at least one photographic performance metric is sales performance.

2. A method according to claim 1, wherein the sales data are at least one selected from the group consisting of: data regarding quantity of images purchased, data regarding sizes of images purchased, data regarding purchases of image reprints, data regarding customer return to purchase previously unpurchased images, data regarding customer return for capturing new images, and data regarding amounts paid for purchases of images.

3. A method according to claim 1, wherein said image information includes image content data for at least one stored image.

4. A method according to claim 3, wherein the image content data are at least one selected from the group consisting of: data regarding use of props in the image, data regarding expressions of subjects of the images, data regarding posture of subjects of the images, data regarding the selection of subjects from a group of potential subjects for inclusion in the images, and data regarding the relative positioning of subjects within an image.

5. A method according to claim 1, wherein said image information includes image capture data for at least one stored image.

6. A method according to claim 1, wherein said image information includes sales condition data for at least one stored image.

7. A method according to claim 5, wherein the image capture data are one or more of those selected from the group consisting of: time elapsed between consecutive images, time required to complete an image capture session, identity of a photographer recording the images, and total number of images captured in an image capture session.

8. A method according to claim 6, wherein the sales condition data are at least one selected from the group consisting of: data regarding special effects included in an image and data regarding style of presentation of images captured and being sold.

9. A method according to claim 1, further comprising:
providing a memory in which said images are digitally stored;
storing the image information in said memory; and
providing a processor in communication with said memory, and
wherein the processor obtains the image information and automatically generates said photographic performance metric.

10. A method according to claim 9, wherein said image information includes sales data for at least one stored image, said method further comprising:
providing a sales device in communication with said memory for generating the sales data; and
storing the sales data to the memory such that the sales data can be associated with at least one image.

11. A method according to claim 9, wherein the camera device is a digital camera, said method further comprising:
automatically generating with said digital camera at least some image information associated with said images recorded by said digital camera.

12. A method according to claim 11, further comprising the steps of selectively displaying with a display device in communication with said memory a performance metric and an associated image.

13. A method according to claim 1, further comprising manually compiling image information related to said images.

14. A system for automatically evaluating photographic performance, said system comprising:
at least one digital image generation device configured to record one or more digital images during a photography session;
at least one database configured to obtain and store digital images form said digital image generation device and automatically compiled image information associated with the digital images; and
a processor configures to obtain the digital images and the image information and to automatically generate at least one photographic performance metric using at least one of the digital images and the image information, said performance metric facilitating evaluation of one or more aspects of photographic performance,
wherein said image information includes sales data for at least one stored image and at least one photographic performance metric is sales performance.

15. A system according to claim 14, wherein said digital image generation device is selected from the group consisting of a digital camera, a digital video source, and a scanner.

16. A system according to claim 14, wherein said processor is located remotely from said database.

17. A system according to claim 16, further comprising a central database remotely located from said database and connected thereto via a network, said central database configured to selectively perform at least one of uploading or downloading said digital images and digital information at efficient intervals.

18. A system according to claim 14, wherein said database is further configured to store the performance metrics in association with the digital images and image information.

19. A system of claim 18, further comprising a remote evaluation system including a central database remotely located from a plurality of said databases and connected thereto via a network, said central database configured to selectively perform at least one of uploading or downloading said digital images and digital information at efficient intervals.

20. A system of claim 19, wherein said remote evaluation system further includes a display device in communication with said central database and configured for selective display of one or more of the group consisting of: stored images, image information associated with stored images, and the performance metrics generated by the processor.

21. A system according to claim 14, wherein said digital image generation device is configured to automatically generate at least some of the image information associated with each of the digital images and send that image information to said database.

22. A system according to claim 14, further comprising a sales device in communication with said database for generating sales data, the sales data being stored in said database as part of the image information.

23. A system according to claim 14, further comprising an input device in communication with said database configured for selectively entering at least some of the image information.

24. A system according to claim 23, wherein said input device is selected form the group consisting of: a scanner, a mouse, a card reader, and a keyboard.

25. A system according to claim 23, further comprising a display device in communication with said database and configured for selective display of one or more of the group consisting of: stored images, image information associated with stored images, and the performance metrics generated by the processor.

26. A computer program product for facilitating the automatic generation of photographic performance metrics, the computer program product comprising a non-transitory computer-readable storage medium having computer-readable program code portions stored therein the computer-readable program code portions comprising:
- a first executable code portion for automatically compiling image information related to at least one digitally stored images; and
- a second executable code portion for automatically generating at least one photographic performance metric using at least one of the digitally stored images and the automatically compiled image information related to the stored images, said performance metric facilitating evaluation of one or more aspects of photographic performance,
- wherein said image information includes sales data for at least one stored image and at least one photographic performance metric is sales performance.

27. A computer program product according to claim 26, further comprising a third executable code portion for receiving and compiling user inputted image information via a user input device.

28. A computer program product according to claim 26, further comprising a third executable code portion for receiving and storing data from a device selected from the group consisting of a sales device, a user input device, a digital image generation device, and one or more remote memories connected via a computer network.

29. A computer program product according to claim 26, further comprising a third executable code portion for selectively displaying with an associated display device a performance metric and an associated image.

30. A computer program product according to claim 26, further comprising a third executable code portion for storing images from a digital image generation device.

* * * * *

UNITED STATES PATENT AND TRADEMARK OFFICE
CERTIFICATE OF CORRECTION

PATENT NO.        : 8,065,197 B2  
APPLICATION NO.   : 11/682471  
DATED             : November 22, 2011  
INVENTOR(S)       : Grosso et al.

Page 1 of 1

It is certified that error appears in the above-identified patent and that said Letters Patent is hereby corrected as shown below:

Column 14,  
Line 2, "form" should read --from--;  
Line 5, "configures" should read --configured--.

Signed and Sealed this  
Thirteenth Day of November, 2012

David J. Kappos  
*Director of the United States Patent and Trademark Office*